(12) United States Patent
Rajusth

(10) Patent No.: US 6,684,760 B1
(45) Date of Patent: Feb. 3, 2004

(54) BAKING PAN WITH HINGED FOLD DOWN SIDES

(75) Inventor: Aneela Rajusth, 441 Liberty Ct., Schaumburg, IL (US) 60194

(73) Assignee: Aneela Rajusth, Schaumburg, IL (US)

( * ) Notice: Subject to any disclaimer, the term of this patent is extended or adjusted under 35 U.S.C. 154(b) by 0 days.

(21) Appl. No.: 10/447,830

(22) Filed: May 29, 2003

(51) Int. Cl.[7] .................. A47J 37/00; A47J 37/04; A23L 1/00
(52) U.S. Cl. ................ 99/449; 99/426; 99/432; 99/DIG. 15; 220/6; 220/574; 220/912
(58) Field of Search ............... 99/339, 340, 426–442, 99/444–450, DIG. 15; 220/574, 912, 573.1, 7, 737, 495.03, 6–8, 4, 28, 532, 533, 512; 206/551, 804; 229/123, 406; 249/61, 95, 131, 243, 169, 172, 129, 136, DIG. 1, 97, 163, 168, 170, 117, 155; D7/584, 354; 426/115, 523

(56) References Cited

U.S. PATENT DOCUMENTS

| 428,792 A | 5/1890 | Willey ..................... 249/172 |
|---|---|---|
| 1,714,379 A | 5/1929 | Krantz ..................... 249/169 |
| 2,714,465 A | 8/1955 | Blair ........................... 220/6 |
| 3,580,484 A | 5/1971 | Schneider ................. 220/574 |
| 3,828,966 A | 8/1974 | Martin ......................... 220/7 |
| 3,858,495 A | 1/1975 | Gotwalt ................ 99/421 HH |
| 4,113,225 A | 9/1978 | Corse ....................... 249/169 |
| 4,446,982 A | 5/1984 | Corse ........................... 220/8 |
| 4,644,858 A | 2/1987 | Liotto et al. ................ 99/449 |
| 4,773,320 A | 9/1988 | Stock et al. ................ 99/449 |
| 5,560,286 A | 10/1996 | Fabrikant et al. ........... 99/426 |
| 5,779,080 A | 7/1998 | Corse ....................... 220/4.28 |
| 6,505,809 B1 | 1/2003 | Reed .......................... 249/95 |

*Primary Examiner*—Timothy F. Simone
(74) *Attorney, Agent, or Firm*—Donald W. Meeker

(57) ABSTRACT

A baking pan bottom has a recessed stepped edge all around the periphery and an internal rod around the entire pan to act as a pivot pin hinge on all four sides. The side panels and end panels of the pan are provided with a mating protruding step along a bottom edge to mate with the recessed stepped edge of the bottom to prevent leakage. The hinge enables each side panel and end panel to pivot down for access to the baked goods and pivot back up for cooking. A sliding lock mechanism in the end panels has hooks that engage loops in the overlapping extending end portions of the side panels to lock the side panels in place for cooking. The baking pan has an additional flat baking sheet, which fits on the pan bottom. The interior surfaces comprise a non-stick scratch resistant surface, which is dishwasher safe.

8 Claims, 2 Drawing Sheets

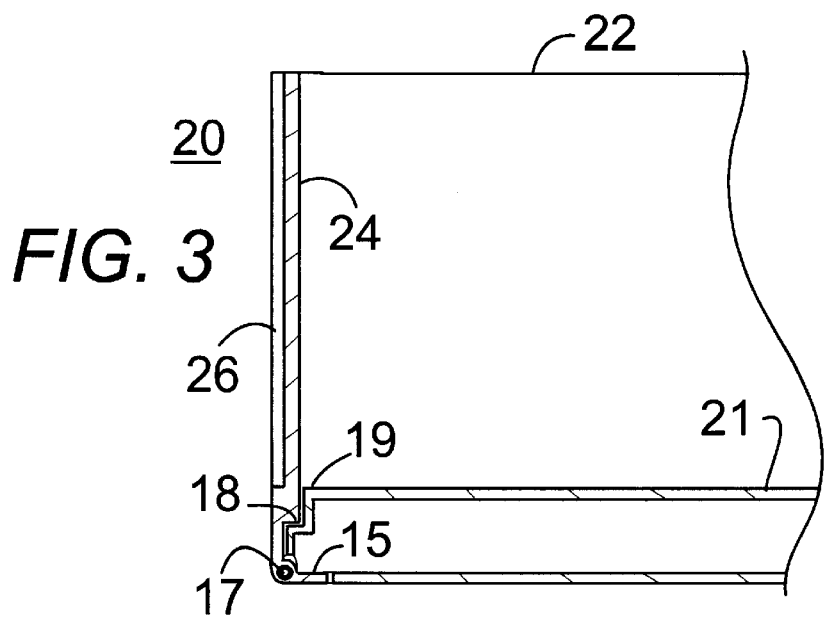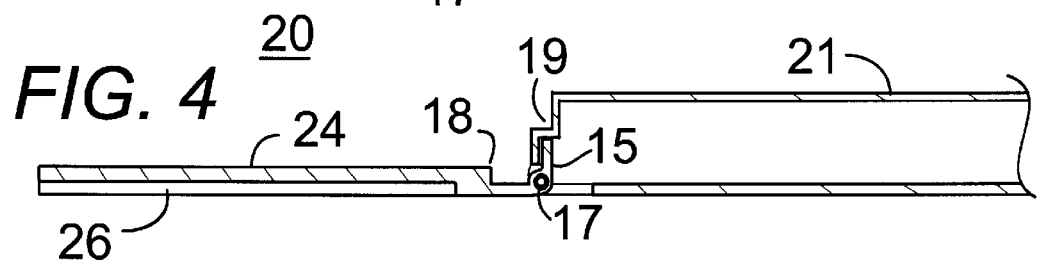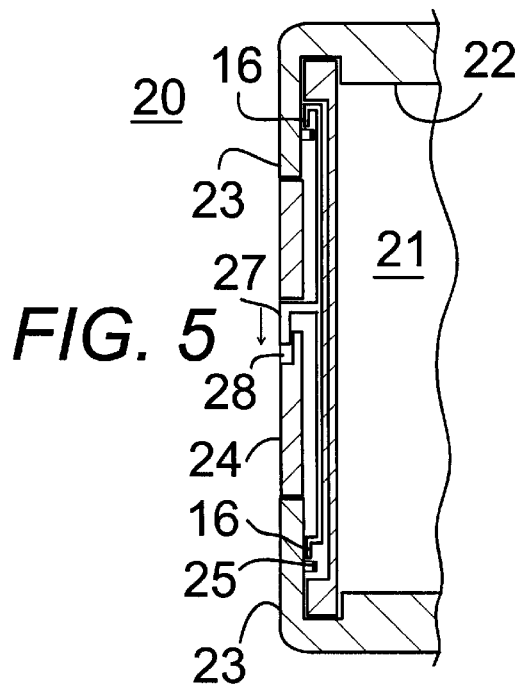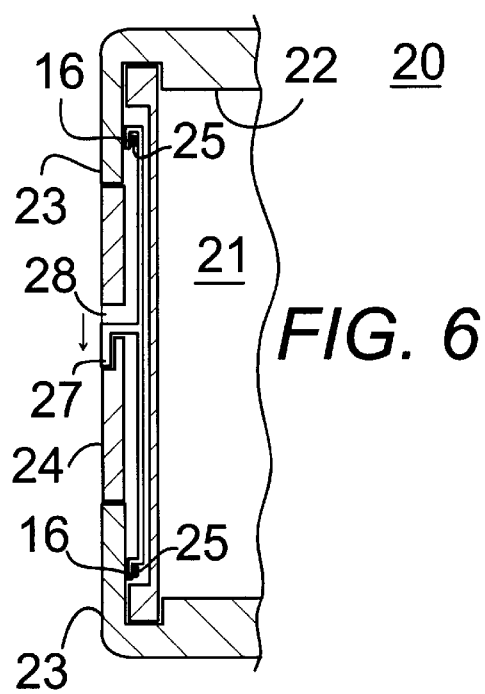

BAKING PAN WITH HINGED FOLD DOWN SIDES

BACKGROUND OF THE INVENTION

1. Field of the Invention

The present invention relates to cooking utensils and, more particularly to an improved baking pan with hinged end and side panels that fold down with non-stick, scratch resistant surfaces.

2. Description of the Prior Art

Many utensils designed for use in preparing baked goods make it extremely difficult to remove food items like lasagna, brownies or cake from the pan without loosing the aesthetic presentation of that item and generally destroys the efforts the cook has spentin preparing that item.

There have been several approaches to solve the problem of removing baked goods from the pan without ruining the appearance of the item. One example of such a prior art device is a round baking utensil that has a relatively flat member pivotally mounted at the center of the baking pan on the inner surface extending radially outward to the edge of the baking pan and also has a member extending upward so that after a round pie or cake has been baked, this pivotally mounted member may be rotated around the edge of the baking pan to separate the baked goods from the pan. A major disadvantage of this type of prior art baking utensil is that the concept may be used effectively only with round baking pans.

Other attempts to solve the problem of easy access and removal of baked goods from the pan have resulted in single use baking utensils where a portion of the periphery of the baking utensil was broken or bent away to allow access to the baked goods contained within the utensil. An example of this type of prior art device is U.S. Pat. No. 3,580,484. The most obvious disadvantage of such device is that it is expensive being a single use device that must be discarded after one use.

Prior art U.S. Pat. No. 428,792, issued May 27, 1890 to Willey, is for a baking tin or dish that is provided with a loose or removable bottom and loose sides that fall away from the cake or bread when baked, leaving it on the bottom alone to cool. The side and the end pieces composing the dish are loosely attached to a wire in their bottom edge upon which they swing, and on which the bottom of the utensil rests. Another wire, sliding up and down around the outside of the dish, operates said pieces.

Prior art U.S. Pat. No. 3,828,966, issued Aug. 13, 1974 to Martin, puts forth a collapsible baking pan that has a disposable liner of aluminum foil. The pan can be collapsed to a substantially flat position for ease of storage.

Prior art U.S. Pat. No. 1,714,379, issued May 21, 1929 to Kratz, concerns a baking pan with removable sides and ends so that a cake or loaf baked in the pan can be easily removed therefrom, without damage to the baked item. The sides and ends of the pan can be quickly removed and replaced. A latch means is provided for fastening the sides and ends together in such a manner that none of the material placed in the pan will leak through the joints of the pan.

Prior art U.S. Pat. No. 6,505,809, issued Jan. 14, 2003 to Reed, provides an apparatus and method for shaping and molding material that has two side walls, two end walls, a bottom and at least one partition. The two side walls have grooves spaced at predetermined intervals on an inside surface for receiving a partition and a bottom ledge for retaining the bottom. The inside surface has a plurality of openings sized for receiving holding members and may have a variety of shapes. The bottom is shaped to mate with the shape of the inside surface of the side walls. The two end walls include locking mechanisms for holding the various components of the apparatus together.

Prior art U.S. Pat. No. 4,644,858, issued Feb. 24, 1987 to Liotto, depicts a dual-purpose baking pan assembly that is suitable for use in a conventional oven wherein the assembly as well as the food therein are exposed to a high-temperature atmosphere, and in a microwave oven wherein the atmosphere is close to ambient temperature and the assembly and the food are subjected to microwave energy. All components of the assembly are formed of a dielectric material unaffected by microwave energy and capable of withstanding high temperatures. The assembly is constituted by a circular base which fits into an annular groove formed in a cylindrical shell defined by a pair of complementary half-sections whose rear ends are hinged together by a removable pivot pin and whose front ends are joinable by a detachable clamp. Thus, after a food product is baked in the assembly, the shell thereof may be detached from the base to expose the food product without disrupting its structure.

Prior art U.S. Pat. No. 5,779,080, issued Jul. 14, 1998 to Corse, shows a multi-purpose baking pan that has a pan portion for holding batter. A pastry holder is included to allow the user to bake differently-shaped pastries which can be inserted into the pan portion. The pan portion has a rectangular bottom wall with two side walls which extend integrally in the same direction from the bottom wall along the opposite edges. There are two end members, located at the short sides of the rectangular bottom, each have a rod-like hinge pin. Rotating an end member, by grasping and raising the lower portion thereof, allows the user to slide out the pastry holder without damage to the pastries or to the user. The multi-purpose baking pan also has a cover to protect the pastries within the baking pan.

Prior art U.S. Pat. No. 4,773,320, issued Sep. 27, 1988 to Stock, discloses a baking pan similar to a conventional baking pan except that the pan has a removable end section. The end section can be used to close one end of the pan when the baked goods are in a pre-cooked condition to prevent batter or the like from leaking out of the pan. The end section can be readily removed when the baked goods are to be served so that every piece of the baked goods can be removed without deforming such piece of baked goods or breaking it into pieces which would destroy the aesthetic presentation thereof.

Prior art U.S. Pat. No. 4,446,982, issued May 8, 1984 to Corse, claims a multi-purpose baking pan that is formed from a bottom pan member which has a convex bottom surface and a pair of side members that have a number of pairs of spaced apart holes. First and second end pieces are adapted to mate with respective pairs of holes in the side members of the bottom pan portion to form a baking pan of predetermined size. Different sized baking pans may be formed with the same structure by moving one or both of said end pieces to different pairs of holes along the bottom pan portion. A cupcake holder or similar plate having a number of holes therein may be mounted within the baking pan. The bottom portion of the pan member has a convex shape to mate with the end pieces and form a batter tight fit.

Prior art U.S. Pat. No. 4,113,225, issued Sep. 12, 1978 to Corse, describes a baking pan that has a removable end portion that allows easy access to the baked goods after baking. The removable end portion may be used as a spatula to lift the baked goods from the baking pan with minimum damage of the baked goods due to sticking.

Prior art U.S. Pat. No. 3,580,484, issued May 25, 1971 to Schneider, provides a portion access pie plate that is designed for gaining access to a piece of pie without mutilation of the pie. The pie plate involves lines of weakening extending radially from the center of the pie plate, which define segments specifically through the rim and sides of the plate. The segmental sections of the sides and rim are hinged and depressible for exposing cut portions of pie and also have a lever action that lifts and loosens the pie, thereby facilitating extraction of pie portions without mutilation.

What is needed is a baking pan with hinged sides that fold down for easy access to the baked item including overlapping edges to prevent leakage and a lock closure to insure that the hinged sides stay in place during baking also a non stick and scratch resistant surface so cutting can be done in pan for easy transfer to plate.

SUMMARY OF THE INVENTION

An object of the present invention is to provide a baking pan with hinged sides that fold down for easy access to remove the baked item(s).

Another object of the present invention is to provide an improved baking pan with overlapping bottom edges to prevent leakage.

One more object of the present invention is to provide an improved baking pan with a lock closure to insure that the hinged sides stay in place during baking.

An additional object of the present invention is to provide an improved baking pan with concealed hinges and smooth overlapping sides to prevent catching material on the outside of the pan and to create a smooth attractive appearance.

A further object of the present invention is to provide an improved baking pan with surfaces that are scratch resistant and non-stick and dishwasher safe.

In brief, the baking pan has a rectangular bottom with a recessed stepped edge all around the periphery and an internal rod around the entire pan to act as a pivot pin hinge on all four sides. All of the sides of the pan are provided with a mating protruding step along a bottom edge to mate with the recessed stepped edge of the pan bottom to prevent leakage. The bottom of each edge pivotally engages the rod to provide a hinge enabling each side to pivot down for access to the baked goods and pivot back up for cooking. One pair of opposing side walls, such as the long side walls of a rectangular pan, overlaps the adjacent pair of side walls, such as the end walls. A sliding lock mechanism in the end walls has hooks that engage loops in the overlapping portions of the long side walls to lock the sides in place for cooking. The baking pan furthercomprises an additional flat baking sheet capable of fitting on the pan bottom in contact with the end panels and side panels. The additional flat baking sheet acts as a tray and is inserted in the pan before batter goes into pan so when item is baked it can easily be removed from pan and taken straight to the table. The flat baking sheet can be used with pan or can also be used alone as a cookie sheet. The baking pan may be manufactured with a handle protruding from at least two opposing panels. The top surface of the pan bottom and interior facing surfaces of the end panels and side panels further comprise a non-stick coating, which is also a scratch resistant surface. The baking pan is fabricated of material that is capable of being washed in a dishwasher.

An advantage of the present invention is that the baked goods may be removed without damage to the presentation of the baked item.

Another advantage of the present invention is that the batter will not leak through the seams.

An additional advantage of the present invention is that the surface is non-stick.

One more advantage of the present invention is that the surface is scratch-resistant.

Yet another advantage of the present invention is that baking pan is dishwasher safe.

Still another advantage of the present invention is that the hinged sides stay in place during baking.

A further advantage of the present invention is that the external portion of the pan has a smooth attractive appearance.

Yet another advantage of the present invention is that it has an additional flat baking sheet capable of fitting inside the pan bottom that acts as a tray as well as without the baking pan as a cookie sheet.

BRIEF DESCRIPTION OF THE DRAWINGS

These and other details of my invention will be described in connection with the accompanying drawings, which are furnished only by way of illustration and not in limitation of the invention, and in which drawings:

FIG. 3 is a side cross-sectional view of the invention of FIG. 1 showing the end of the pan with the end side in the closed position for cooking and showing the hinge rod and the protruding stepped bottom of the side mating with the recessed stepped edge of the bottom of the pan;

FIG. 4 is a side cross-sectional view of the invention of FIG. 1 showing the end of the pan with the end side in the open position for easy access to the cooked food;

FIG. 5 is a top cross-sectional view of the invention of FIG. 1 showing the end of the pan with the end side in the closed position for cooking and showing the locking mechanism in the open position;

FIG. 6 is a top cross-sectional view of the invention of FIG. 1 showing the end of the pan with the end side in the closed position for cooking and showing the locking mechanism in the locked position.

BEST MODE FOR CARRYING OUT THE INVENTION

Figure 1:
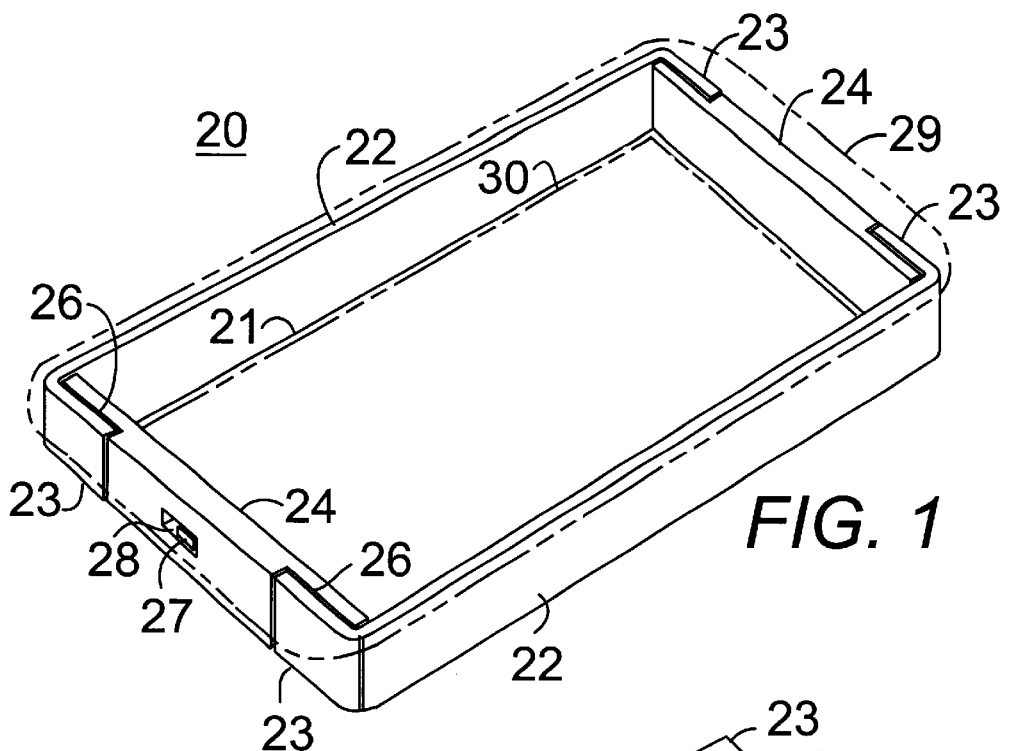
FIG. 1 is a perspective view of the invention with the sides locked in the closed position for cooking.

In FIGS. 1–6, a baking pan 20 is shown that has hinged side panels 22 and hinged end panels 24. The baking pan 20 includes a pan bottom 21 that comprises a rigid flat surface, which has a recessed stepped edge 19 around a perimeter of the pan bottom 21 and an internal peripheral opening housing an elongated rod 17 that has a circular cross-section and is positioned internally around the perimeter of the pan bottom 21.

Each end panel 24 has a bottom interior opening that is capable of pivotally engaging at least a portion of the elongated rod 17 on each of two opposing ends of the pan bottom 21. Each of the pair of end panels 24 further comprise a bottom protruding stepped edge 18 that is capable of mating with the recessed stepped edge 19 on each of the two opposing ends of the pan bottom 21 to form a sealed end bottom seal impermeable to liquids, as shown in FIGS. 1 and 3. Each of the pair of end panels 24 further comprises a recessed surface 26 on each end of an outer face of the end panel 24. The recessed surface 26 is capable of receiving an extending edge 23 of the side panels 22 so that an outer face of the extending edge 23 is aligned with the outer face of the end panel 24, as shown in FIGS. 1, 5 and 6. Each end panel 24 has an orthogonal bottom lip 15 facing inwardly so that when the end panel is lowered the bottom lip acts as a stop abutting an interior wall of the pan bottom protruding step 19 to maintain the end panel in a plane parallel to the pan bottom.

The baking pan 20 further comprises a pair of side panels 22. Each side panel 22 has a bottom interior opening capable of pivotally engaging at least a portion of the elongated rod 17 on each of two opposing sides of the pan bottom 21. Each of the pair of side panels 22 also comprise a bottom protruding stepped edge 18 capable of mating with the recessed stepped edge 19 on each of the two opposing sides of the pan bottom 21 to form a sealed side bottom seal impermeable to liquids. Each of the pair of side panels 22 further comprises an inwardly extending edge 23 hinged to the side panel on each of two ends of each of the side panels 22. The extending edge 23 is capable of overlapping the recessed surface 26 on one end of one of the pair of end panels 24 and capable of lying flat with the side panel in the open position. Each side panel 22 has an orthogonal bottom lip, similar to the bottom lip 15 of the end panel shown in FIGS. 3 and 4, facing inwardly so that when the side panel is lowered the bottom lip acts as a stop abutting an interior wall of the pan bottom protruding step 19 to maintain the side panel in a plane parallel to the pan bottom.

The baking pan 20 also includes a locking mechanism 27 that is capable of removably interconnecting each of the extending edges 23 of the each of the side panels 22 with the end of the end panel 24. Each of the extending edges 23 of the pair of side panels 22 has an external loop 25 on an interior face of the extending edge. The locking mechanism 27 comprises a sliding lock that has a pair of hooks 16. Each pair of hooks 16 is capable of engaging the external loop 25 of one of the extending edges 23 when the sliding lock 27 is moved from an open position, shown in FIG. 5, to a locked position, shown in FIG. 6.

The baking pan 20 further comprises an additional flat baking sheet 30 capable of fitting on the pan bottom 21 in contact with the end panels 24 and side panels 22, as shown in FIG. 1. The baking pan 20 may also further comprise a handle 29 means protruding from at least two opposing panels 22 and 24, also shown in FIG. 1.

At least a top surface of the pan bottom 21 and interior facing surfaces of the pair of end panels 24 and the pair of side panels 22 of the baking pan 20 further comprise a non-stick coating, which is also a scratch resistant surface. The baking pan 20 is fabricated of material that is capable of being washed in a dishwasher.

In practice, a user would assemble the baking pan 20 by raising the end panels 24 to an upright position, then raising the side panels 22 to an upright position, thereby interconnecting each of the extending edges 23 of the side panels 22 to the ends of the pair of end panels 24 in the recessed surfaces 26, as shown in FIG. 1. The locking mechanism 27 would then be accessed through an opening 28 in the end panels 24 and moved to engage a pair of hooks 16 with the external loops 25 of the extending edges 23, as shown in FIG. 6. At this point an optional flat baking sheet 30 may be placed on the bottom 21 of the baking pan 20. The batter could be poured into the baking pan 20 once it is fully assembled, as shown in FIG. 1. All of the upright panels of the pan 22 and 24 are provided with a mating protruding step 18 along a bottom edge to mate with the recessed stepped edge 19 of the bottom 21 to prevent leakage when fully assembled, an example is shown in FIG. 3.

Figure 2:
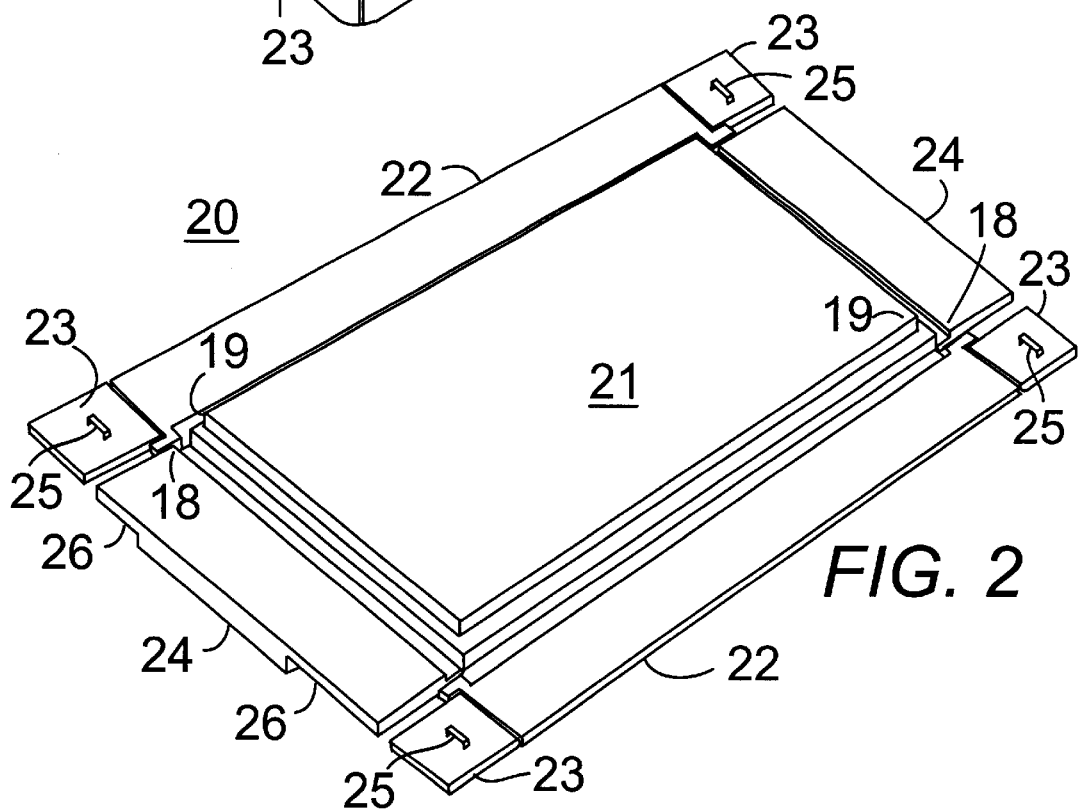
FIG. 2 is a perspective view of the invention of FIG. 1 with the sides pivoted down in the open position for easy access to the cooked food.

To remove the baked goods from the baking pan 20, a user would release the locking mechanism 27 to the position of FIG. 5, thereby allowing the side panels 22 to be released from the end panels 24. The side panels 22 and the end panels 24 may then be pivoted down for access to the baked goods, as shown in FIGS. 2 and 4.

In the manufacturing process the top surface of the pan bottom 21 and interior facing surfaces of the pair of end panels 24 and the pair of side panels 22 of the baking pan 20 are fabricated with a non-stick coating, which is also a scratch resistant surface. The baking pan 20 is formed of material, such as steel, that is capable of being washed in a dishwasher.

It is understood that the proceeding description given merely by way of illustration and not in limitation of the invention and that various modifications may be made thereto without departing from the spirit of the invention as claimed.

What is claimed is:

1. A baking pan having hinged sides that fold down, the baking pan comprising:

a pan bottom comprising a rigid flat surface having a recessed stepped edge around a perimeter of the pan bottom and an internal peripheral opening housing an elongated rod having a circular cross-section around the perimeter of the pan bottom;

a pair of end panels each having a bottom interior opening capable of pivotally engaging at least a portion of the elongated rod on each of two opposing ends of the pan bottom and each of the pair of end panels further comprising a bottom protruding stepped edge capable of mating with the recessed stepped edge on each of the two opposing ends of the pan bottom to form a sealed end bottom seal impermeable to liquids;

a pair of side panels each having a bottom interior opening capable of pivotally engaging at least a portion of the elongated rod on each of two opposing sides of the pan bottom and each of the pair of side panels further comprising a bottom protruding stepped edge capable of mating with the recessed stepped edge on each of the two opposing sides of the pan bottom to form a sealed side bottom seal impermeable to liquids, and further comprising an inwardly extending edge on each of two ends of each of the side panels, the extending edge capable of overlapping one end of one of the pair of end panels;

a locking mechanism capable of removably interconnecting each of the extending edges of the each of the side panels with the end of the end panel.

2. The baking pan of claim 1 wherein each of the extending edges of the pair of side panels has an external loop on an interior face of the extending edge and the locking mechanism comprises a sliding lock having a pair of hooks, each of which pair of hooks is capable of engaging the external loop of one of the extending edges when the sliding lock is moved from an open position to a locked position.

3. The baking pan of claim 1 wherein each of the pair of end panels further comprises a recessed surface on each end of an outer face of the end panel, the recessed surface capable of receiving an extending edge so that an outer face of the extending edge is aligned with the outer face of the end panel.

4. The baking pan of claim 1 further comprising an additional flat baking sheet capable of fitting on the pan bottom in contact with the end panels and side panels.

5. The baking pan of claim 1 wherein at least a top surface of the pan bottom and interior facing surfaces of the pair of end panels and the pair of side panels further comprise a non-stick coating.

6. The baking pan of claim 1 wherein at least a top surface of the pan bottom and interior facing surfaces of the pair of end panels and the pair of side panels further comprise a scratch resistant surface.

7. The baking pan of claim 1 wherein the baking pan is fabricated of material which is capable of being washed in a dishwasher.

8. The baking pan of claim 1 wherein the baking pan further comprises a handle means protruding outwardly from at least two opposing panels.

\* \* \* \* \*